Aug. 12, 1969     S. PODWYS     3,460,865
CONVERTIBLE TOP

Filed Oct. 4, 1967     2 Sheets-Sheet 1

INVENTOR
BY Stanley Podwys
ATTORNEY

Aug. 12, 1969 — S. PODWYS — 3,460,865
CONVERTIBLE TOP
Filed Oct. 4, 1967 — 2 Sheets-Sheet 2

INVENTOR
Stanley Podwys
BY D. L. Ellis
ATTORNEY

United States Patent Office 3,460,865
Patented Aug. 12, 1969

3,460,865
CONVERTIBLE TOP
Stanley Podwys, Orchard Lake, Mich., assignor to General Motors Corporation, Detroit, Mich., a corporation of Delaware
Filed Oct. 4, 1967, Ser. No. 672,760
Int. Cl. B60j 7/12
U.S. Cl. 296—117                                       4 Claims

ABSTRACT OF THE DISCLOSURE

A convertible top structure for an automotive vehicle or the like includes a pair of foldable side rail assemblies swingably mounted on the body and a separate generally U-shaped center bow member being independently swingably mounted on the body and movable in unison with the side rails between raised and lowered positions. The spaced legs of the center bow include portions which nest against the rear side rail section immediately outboard thereof in top raised position, and a pair of control links each extending between a respective side rail and body pivots located outboard of the adjacent rear side rail section body pivots operate in tension to exert outboard thrust on the side rails against the center bow in top raised position to establish transverse rigidity in the top structure when in such raised position.

---

This invention relates to convertible tops and more particularly to convertible tops of the inwardly folding side rail type.

In the United States patent to Podwys 3,312,499, issued Apr. 4, 1967, and assigned to the assignee of the present invention, there is disclosed an improved convertible top of the so-called inwardly folding side rail type, having reference to the fact that the side rails undergo folding and unfolding movement between raised and lowered positions in directions both transversely and longitudinally of the body. The present invention is a further improvement in this type of convertible top in respect of providing highly efficient stabilizing structure assuring both longitudinal and transverse rigidity in the top when in raised position.

One feature of this invention is that it provides an improved convertible top including a pair of side rails foldable between raised and lowered positions, means extending transversely between the side rails and operative in tension to restrain transverse outward movement thereof when in raised position, and means operative to exert thrust on each of the side rails in directions transversely outwardly of the body when in raised position against the restraint of the restraining member to establish transverse rigidity in the top structure. A further feature of the invention is that the stabilizing and rigidifying structure obviates the necessity for precision fabricated hinge connections between the various side rail sections of an inward folding convertible top. Another feature of this invention resides in the use of side rail control linkage connected between each side rail and the vehicle body as a longitudinal load bearing member, the linkage being arranged to perform the further function of exerting transverse outward thrust on the side rails in their raised position. Still another feature of this invention resides in the use of a roof supporting bow as the transverse restraining means, the bow being arranged for movement independently of the side rails between a lowered position and a raised position straddling the side rails for restraining engagement therewith under the outward thrust of the control linkage.

These and other features and advantages of the invention will be readily apparent from the following specification and drawings wherein.

Figure 1:
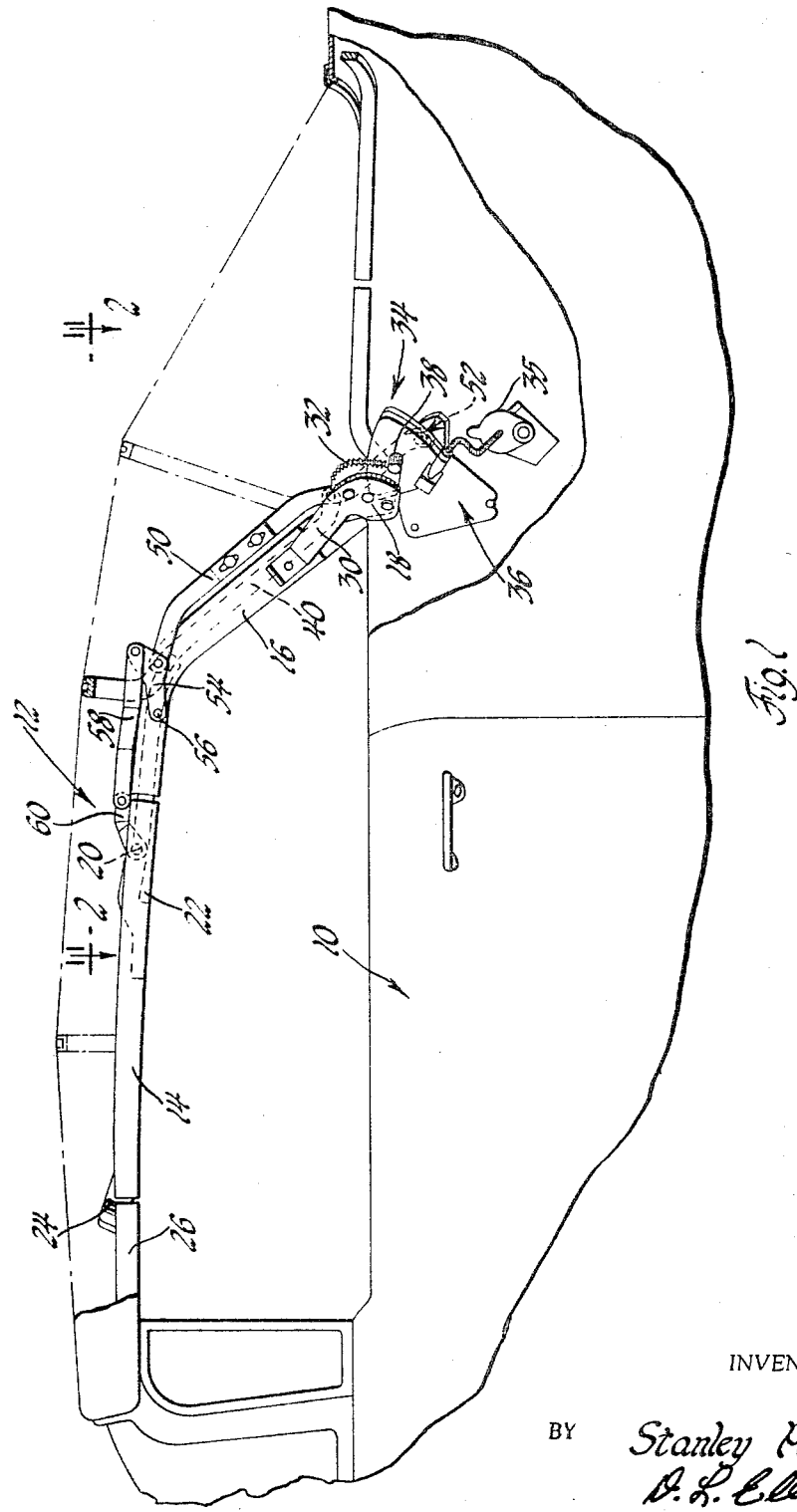
FIGURE 1 is a fragmentary partially broken away elevational view of a convertible vehicle body including a convertible top according to this invention shown in raised position.
Figure 4:
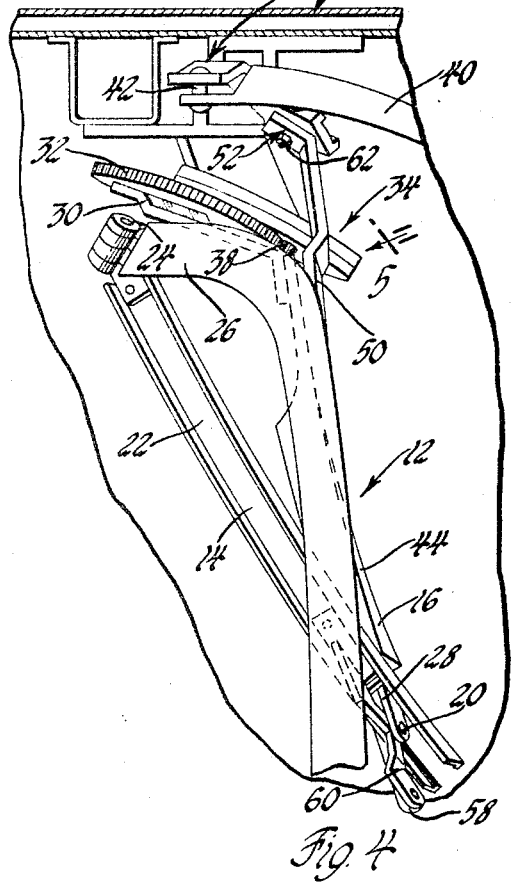
FIGURE 4 is a view similar to FIGURE 2 showing the top in lowered position.

Referring now particularly to FIGURE 1 of the drawings, a convertible vehicle body designated generally as 10 includes a convertible top 12 according to this invention foldable in directions longitudinal and transverse of the body between a raised position as shown, and a lowered position within a folding top well of the body as indicated in FIGURE 4. Folding top 12 includes a transversely spaced pair of longitudinal side rail assemblies each respective to one of the body, only one such side rail assembly 14 being shown. The side rail 14 generally includes a rear side rail section 16 pivotally mounted on the body by a rear hinge pin 18 and pivotally interconnected adjacent its forward end by a hinge pin 20 to a center side rail section 22. Center section 22 is connected at its forward end by a hinge pin 24 to a forward or stub rail section 26 which joins with a generally conventional transverse windshield engaging header, not shown in detail, extending between the two side rail assemblies. Hinge pins 18, 20 and 24 are so arranged with their respective side rail sections as to provide for so-called "cone hinging" in top 12, generally characterized by the fact that the various hinge axes intersect at a convergent point located inwardly of the vehicle body and short of infinity. The principles of operation and advantages of this type of hinging are fully developed in the copending Podwys application Ser. No. 466,020 and need not be dwelt upon in detail herein. The transversely inward and outward folding movement of the side rail sections 16 and 22, that occurs with this type of hinging precludes the use of conventional top stabilizing arrangements and presents additional concerns relating to the transverse support and rigidity required in the side rails in their raised position not encountered in convertible tops which undergo purely longitudinal folding movement.

Figure 2:
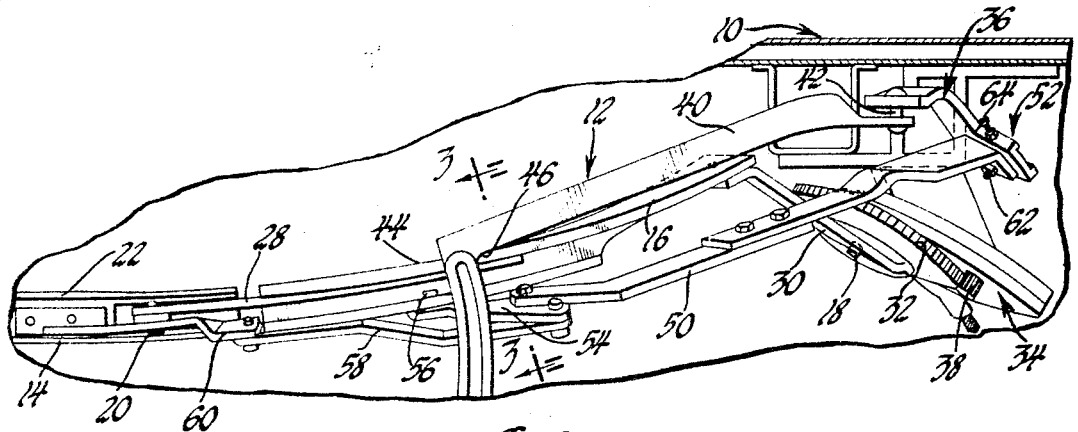
FIGURE 2 is an enlarged partially broken away plan view taken generally along the plane indicated by the lines 2—2 of FIGURE 1.

Referring to FIGURE 2, the side rail sections 16 and 22 are provided of generally channel shaped members, rear section 16 carrying an extension 28 received within the center section 22 and joined thereto at the pivot 20. The rearward portion of rear section 16 is formed of an offset arm 30 mounted on the rear hinge pin 18 and nonrotatably carrying a pair of pins and a sector 32 of a generally conventional gear type top actuator 34. While not shown in detail, the hinge pin 18 is supported on the housing of actuator 34 which in turn is mounted to a bracket structure 36 on the reinforcing inner panel structure of the body. Gearing within actuator 34 is operated by a reversible electric motor 35 to rotate a pinion 38 meshing with the sector 32 whereby to drive the sector and rear section 16 in top raising and lowering directions about hinge pin 18.

Figure 3:
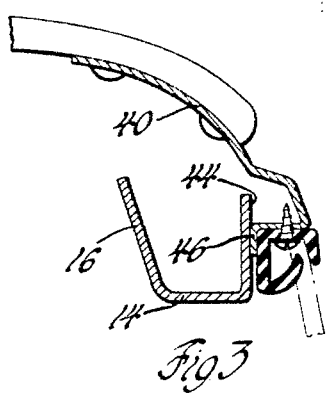
FIGURE 3 is an enlarged sectional view taken generally along the plane indicated by the lines 3—3 of FIGURE 2.

A generally U-shaped center bow member 40 has a leg thereof pivoted at 42 to a leg of the bracket 36 for swinging movement generally longitudinally of body 10 between a raised position as shown in FIGURES 1 and 2, and a lowered position indicated in FIGURE 4. The transverse portion of bow 40 is suitably provided with a tacking strip assembly for attachment of the roof fabric thereto, the connection provided by the roof fabric serving to move the bow 40 between its positions concurrently with movement of the side rails. As seen in FIGURE 2, bow 40 assumes a position straddling the side rails in raised position, and as best seen in FIGURE 3, an outwardly facing leg portion 44 of rear section 16 is flushly engageable with a bent flange portion 46 of the leg of bow 40 when the bow is so straddled over the side rails. As hereinafter explained, this flush engagement or abutment provides for transverse restraint of the side rail assembly 14 when in raised position.

Side rail assembly 14 is provided with longitudinal and transverse stabilizing linkage including a rear control link 50 pivotally mounted at its lower end to a further leg of bracket 36 by a pivot assembly 52. At its other end, link 50 is pivotally connected to a bellcrank 54 which is swingably mounted to the interior face of rear section 16 by a pivot 56. Further connected to bellcrank 54 is one end of a link 58 connected at its other end to a horn 60 of center section 22. As indicated in FIGURE 2, the pivot assembly 52 at the lower end of control link 50 is located at a distance rearwardly, outboard and below the hinge pin 18 and has its axis aligned generally parallel therewith. The axes of th epivot 56 and the bellcrank and link connections are so oriented as to allow rotation of bellcrank 54 free of interference with rear section 16. During unfolding movement of side rail assembly 14 from lowered to raised position, control link 50 is caused to be put into tension to induce clockwise rotation of bellcrank 54 about its pivot 56 and accordingly to exert rearward thrust in link 58 in a manner to provide vertical support to the rear and center sections 16 and 22. Additionally, the control link 50 provides forward reaction meeting the normal rearward tension encountered in the roof fabric as side rail assembly 14 stretches the same in moving to its raised position.

As can be seen from an examination of FIGURE 2, the outboard spacing of pivot assembly 52 relative to the pivot 18 causes the control link 50 to operate in tension in a manner to exert an outward thrust component to the rear section 16 when in raised position. Such thrust engages the rear section 16 with bow 40 at their leg and flange portions 44 and 46 respectively. Considering the identical engagement which obtains between the opposite rear side rail section and the other end of bow 40, it is seen that the bow 40 is placed in tension and that a rigidifying transverse positioning of the side rail occurs.

The use of this structure avoids the necessity for high strength precision fabricated hinge connections between the various side rail sections to derive the required stability in raised position. With particular regard to hinge 18, the stabilizing structure permits flexibility in the connection between the sector 32 and pinion 38 and relieves these parts and the gearing within the actuator 34 of the stressing that would occur during any path deviation or misalignment of the rear section 16 in its travel between raised and lowered positions.

Figure 5:
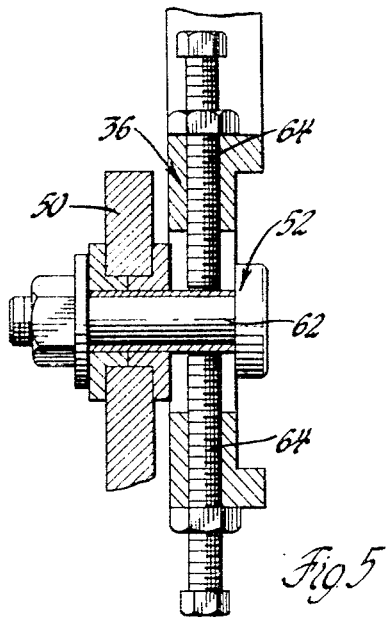
FIGURE 5 is an enlarged sectional view taken generally along the plane indicated by lines 5—5 of FIGURE 4.

As indicated in FIGURES 2 and 5, the control link 50 is provided with means for adjusting its range of travel during movement of the side rail assembly 14 whereby to derive the required degree of tension when in raised position and also to regulate the range of travel of the rear section 16. The control link is shown as being of two sections joined by bolts extending through elongated slots in one of the sections. Within pivot assembly 52, FIGURE 5, a journalling stud 62 carrying the lower end of control link 50 is adjustable in generally vertical direction in an elongated slot in bracket 36 and is held in selected position by a pair of adjusting bolts 64. It will be apparent that other adjusting arrangements are equally well adapted to the use with the control link 50.

Having thus described the invention, what is claimed is:

1. In a convertible vehicle body, folding top structure comprising, a transversely spaced pair of longitudinal side rails foldable between raised and lowered positions, a restraining member extending transversely of the body between said side rails, and means to tension said restraining member between said side rails, said means being operated by movement of said side rails to the raised position thereof to exert thrust on each of said rails transversely outwardly of the body.

2. Folding top structure set forth in claim 1 wherein said thrust exerting means includes control linkage for each said side rail operative to carry longitudinal loading therein, said linkage being further operative in tension to exert outward thrust on said side rails in the raised position thereof.

3. Folding top structure as set forth in claim 2 wherein said linkage is disposed outboard of its respective side rail.

4. Folding top structure as set forth in claim 1 wherein said restraining member is a roof supporting bow mounted on the body independently of said side rails for movement concurrently with the latter between a lowered position and a raised position straddling said side rails, and abutment means on said bow and on said side rails engageable in the raised position of said side rails and said bow.

References Cited

UNITED STATES PATENTS

| 2,823,073 | 2/1958 | Mersheimer | 296—116 |
| 3,312,499 | 4/1967 | Podwys | 296—117 |
| 3,146,022 | 8/1964 | Zeller | 296—116 |

BENJAMIN HERSH, Primary Examiner

J. E. SIEGEL, Assistant Examiner